US009763155B2

United States Patent
Carmon et al.

(10) Patent No.: US 9,763,155 B2
(45) Date of Patent: Sep. 12, 2017

(54) SYSTEMS AND METHODS FOR SLEEP MODE AND STAGED CONNECTIVITY IN MULTI-RAT ENVIRONMENTS

(71) Applicant: Avago Technologies General IP (Singapore) Pte. Ltd., Singapore (SG)

(72) Inventors: Rafael Carmon, Rishon Lezion (IL); Wael Diab, San Francisco, CA (US); Raymond Hayes, Los Gatos, CA (US); Daniel Stopler, Holon (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 468 days.

(21) Appl. No.: 14/270,983

(22) Filed: May 6, 2014

(65) Prior Publication Data

US 2014/0355501 A1 Dec. 4, 2014

Related U.S. Application Data

(60) Provisional application No. 61/830,567, filed on Jun. 3, 2013, provisional application No. 61/943,222, filed on Feb. 21, 2014.

(51) Int. Cl.
*H04W 36/16* (2009.01)
*H04W 52/02* (2009.01)
*H04W 84/22* (2009.01)
*H04W 88/04* (2009.01)

(52) U.S. Cl.
CPC ....... *H04W 36/16* (2013.01); *H04W 52/0206* (2013.01); *H04W 52/0254* (2013.01); *H04W 84/22* (2013.01); *H04W 88/04* (2013.01); *Y02B 60/50* (2013.01)

(58) Field of Classification Search
CPC ......... H04B 7/2126; H04Q 7/00; H04W 8/12; H04W 36/16; H04W 52/02; H04W 52/0209; H04W 28/02; H04W 28/0289
See application file for complete search history.

(56) References Cited

U.S. PATENT DOCUMENTS

| 8,699,464 | B1 * | 4/2014 | Vivanco | ............ | H04W 28/0289 370/331 |
| 2008/0304441 | A1 * | 12/2008 | Tsirtsis | .................... | H04W 8/12 370/328 |
| 2014/0133378 | A1 * | 5/2014 | Wentink | ............... | H04B 7/2126 370/311 |

\* cited by examiner

*Primary Examiner* — Andrew Lai
*Assistant Examiner* — Leon Andrews
(74) *Attorney, Agent, or Firm* — Sterne, Kessler, Goldstein & Fox P.L.L.C.

(57) ABSTRACT

Systems and methods for staged connectivity and sleep mode are provided. Embodiments of the present disclosure optimize power consumption for a user across user devices by creating an ad hoc co-located network of user devices and establishing a device in the co-located network to act as a master (hub) device. In an embodiment, the system includes multiple user wireless devices and a network controller. The network controller identifies a set of proximate wireless devices and the power capability for each wireless device in the set. The network controller then selects a wireless device in the set to act as the hub (master) wireless device based on factors such as the power capabilities of each wireless device. The network controller then instructs the other wireless devices in the set to power down and instructs the appropriate network providers to handover communications to the hub (master) device.

22 Claims, 11 Drawing Sheets

SYSTEMS AND METHODS FOR SLEEP MODE AND STAGED CONNECTIVITY IN MULTI-RAT ENVIRONMENTS

CROSS REFERENCE TO RELATED APPLICATIONS

This application claims the benefit of U.S. Provisional Patent Application No. 61/830,567, filed Jun. 3, 2013, and U.S. Provisional Patent Application No. 61/943,222, filed Feb. 21, 2014, each of which is incorporated by reference herein.

FIELD OF THE INVENTION

This application relates generally to wireless networks including handovers between networks using different radio access technologies.

BACKGROUND

Wireless technologies have become an integral part of communications used by individuals. Traditional cellular networks have evolved to provide both voice and data services to users. In addition, networks such as wireless LAN (e.g., 802.11) networks and WiMAX 802.16e) networks have emerged to provide wireless connectivity to data networks such as the Internet. Because of the increased availability of multiple types of wireless networks, user devices have been developed to work on multiple types of wireless networks.

These devices supporting multiple networks typically do not operate on two different networks simultaneously. As a result, the device is required to select a network for communications. Cellular networks (e.g., 3G, 4G, LTE networks) typically have larger coverage areas than wireless data networks (820.11). Therefore, in some areas, a user may only be able to access and utilize voice and data services through a cellular network. However, when a user enters an area covered by a cellular network and a wireless data network (e.g., 802.11), the device must select a network for communications. For certain types of traffic such as data, it may be beneficial to hand over the communication from a cellular network to the data network.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

With the increase in functionality of wireless user devices, particularly the ability to run resource intense applications, the impact on power resources such as batteries has become a critical consideration. Embodiments of the present disclosure optimize the power consumption for a user across user devices by creating an ad hoc co-located network of user devices and establishing, a device in the co-located network of user devices to act as a master device.

Figure 1:
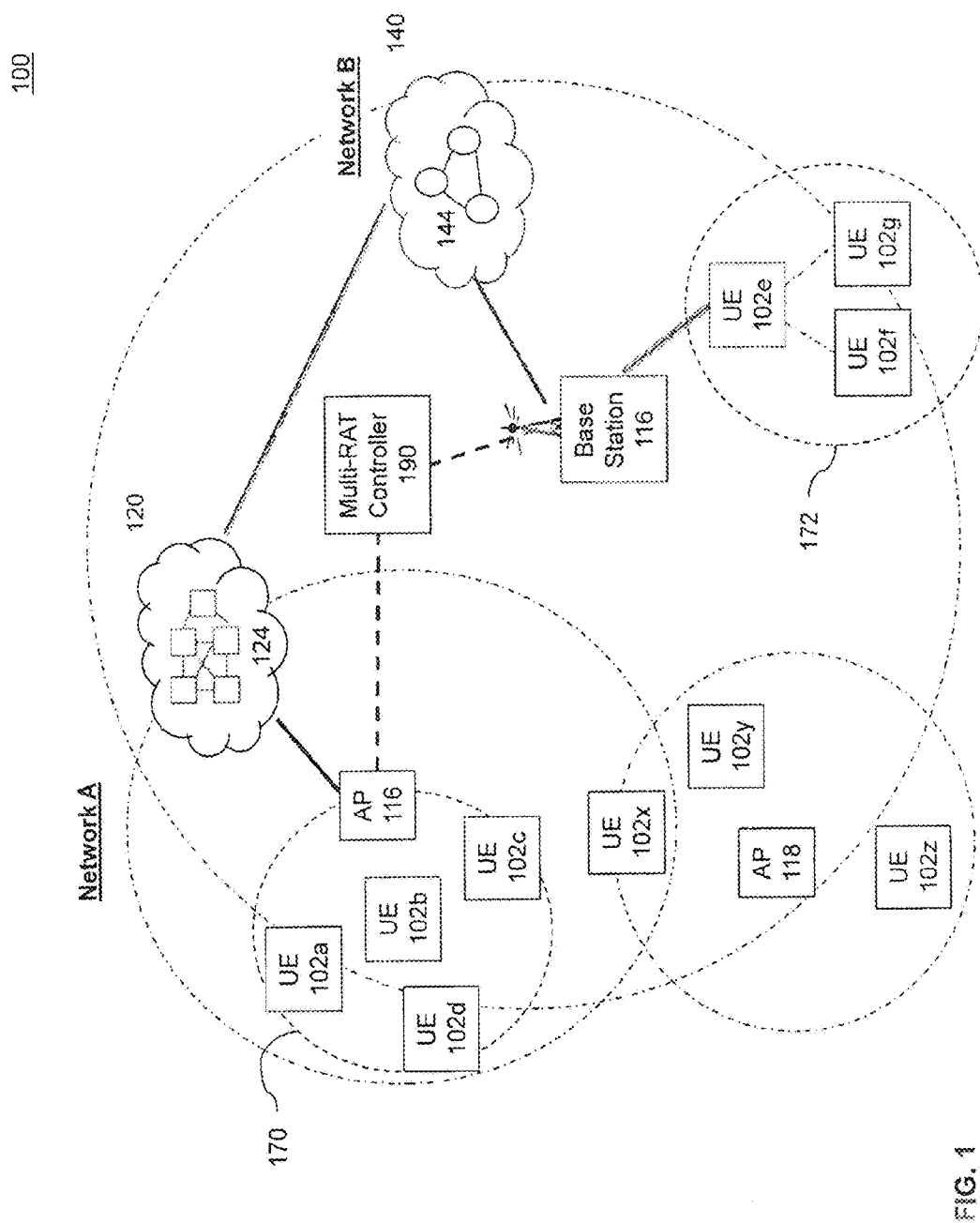
FIG. 1 depicts an exemplary operating environment for a method for peer-to-peer connectivity and handover, according to embodiments of the present invention.

FIG. 1 depicts an exemplary operating environment 100 for a method for peer-to-peer connectivity and handover, according to embodiments of the present invention. Exemplary operating environment 100 includes multiple networks. For ease of discussion, two networks—Network A and Network B are illustrated in FIG. 1. Network A includes a core network 120 having a plurality of switching or routing elements 124. Network B also includes a core network 140 having a plurality of switching or routing elements 144.

Each network utilizes a different radio access technology (RAT) for communication between a user device and the network access device (e.g., base station, evolved NodeB (eNB) or access point) over the air interface. A RAT is typically optimized for certain types of traffic. For example, CDMA, FDMA, OFDMA, GSM are optimized for voice traffic and 802.11 and 802.16(e) are optimized for data traffic. A user device connects to network A or B through a network access interface device.

In embodiments, Network A is a wireless data network such as a network based on the 802.11 standard. A user device, also referred to as a UE, accesses network A via an access point such as access point 116. Network B may be an LTE network. A UE therefore access network B via a base station 146.

Operating environment 100 further includes a multi-RAT controller 190. Multi-RAT controller 190 is configured to manage peer-to-peer connectivity and handover. Although illustrated as a centralized controller, in embodiments, multi-RAT controller 190 can be distributed or cloned in one or more networks. Additional details of multi-RAT controller 190 are described relative to the embodiments below.

A user often has several wireless devices of varying types with many common and differing capabilities. These user wireless devices are often co-located at a user's home, a user's work environment, and/or carried together by a user when commuting or traveling. In embodiments of the present disclosure, a centralized controller has knowledge of user device relationships and leverages the relationships to optimize handovers and communications pathways. For example, a user may have one or more computing devices having wireless communications capabilities such as a laptop or tablet and one or more wireless phones within his or her home.

As illustrated in FIG. 1, a set of user devices may often be in close proximity to each other. As described in further detail in the embodiments below, multi-RAT controller 190 is configured to determine a set of devices associated with a user that are in close proximity to one another and establish an ad-hoc network of co-located devices.

A UE 102 may be any wireless device such as a mobile phone, laptop, PDA, etc. In embodiments, UE 102 supports multiple RATS (e.g., CDMA, GSM and/or WLAN). When UE 102 travels between coverage areas, a handover occurs. During a handover (also referred to as a handoff), a wireless device changes its primary association from the current serving network access device (e.g., base station or access point) to another network access device. A handover may be triggered by a variety of factors such as a decrease in link quality or network loading. When UE 102 travels between coverage areas using the same RAT, a horizontal handover occurs. When UE 102 travels between coverage areas between networks using different RATS (e.g., Network A and Network B), a vertical handover occurs (i.e., RAT changed).

Figure 2:
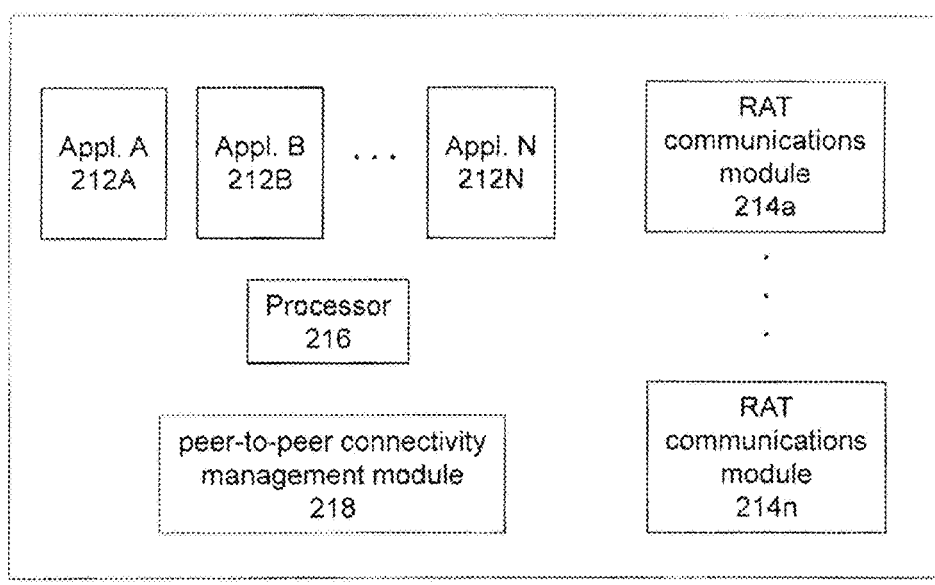
FIG. 2 depicts an exemplary UE, according to embodiments of the present disclosure.

FIG. 2 depicts an exemplary UE 202, according to embodiments of the present disclosure. UE 202 is a multi-RAT device. Therefore, UE 202 includes at least two RAT communications modules 214. Each RAT module 214 is configured to support a specific radio access technology. For example, RAT module 214a may support a cellular protocol such as CDMA, OFDMA, or GSM and RAT module 214n may support a data network protocol such as 802.11.

UE 202 further includes a processor 216 configured to execute one or more applications 212. Applications 212 may include, for example, e-mail, a video player, an audio player, games, etc. UE 202 also includes a peer-to-peer connectivity management module 218. In an embodiment, peer-to-peer connectivity management module 218 is configured to manage communication, connectivity, and processing for UE 202 when UE 202 is utilized in a peer-to-peer arrangement. Additional details of peer-to-peer connectivity management module 218 are described relative to the embodiments below.

Commissioning a UE-AP

When a user has a set of UEs located in close proximity to one another, one of the UEs can be designated as a hub for the other UEs. The designated UE can be considered a UE-AP for the ad hoc grouping of UEs. In embodiments of the present disclosure, the UE-AP is commissioned by the network to service the other UEs in the ad hoc grouping.

Figure 3:
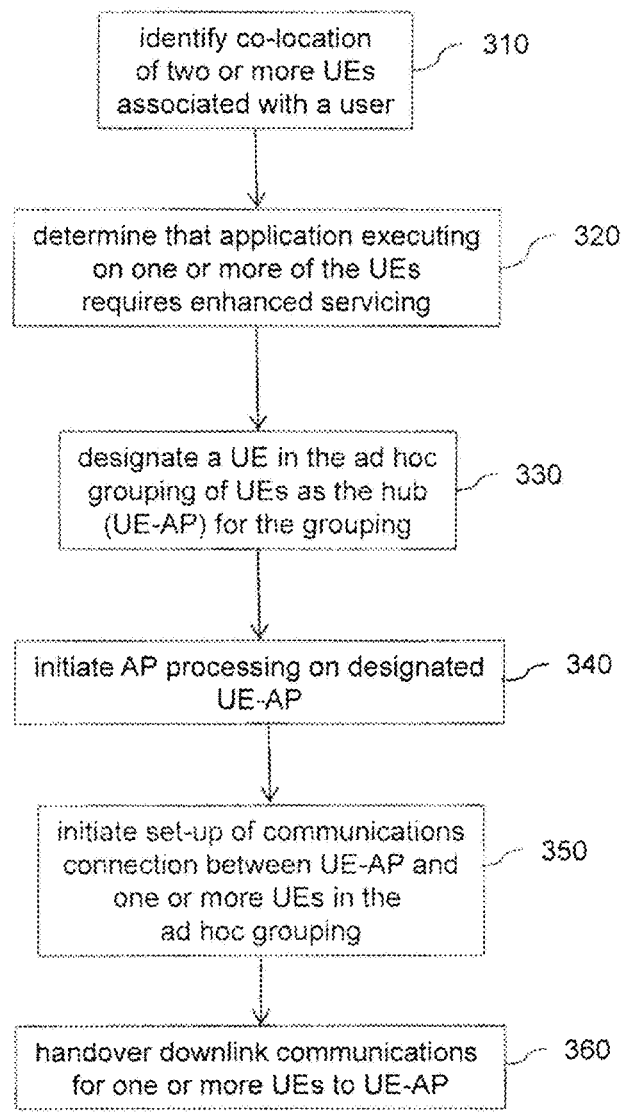
FIG. 3 depicts a flowchart of a method for commissioning a UE-AP to service one or more UEs in an ad hoc grouping of UEs, according to embodiments of the present disclosure.

FIG. 3 depicts a flowchart 300 of a method for commissioning a UE-AP to service one or more UEs in an ad hoc grouping of UEs, according to embodiments of the present disclosure. Flowchart 300 is described with continual reference to the embodiments described in FIGS. 1 and 2. However, flowchart 300 is not limited to those embodiments.

In step 310, multi-RAT controller 190 identifies two or more co-located user devices associated with a user. For example, multi-RAT controller 190 may store a profile for a user. The user profile identifies devices associated with the user. Multi-RAT controller 190 may determine that the devices associated with the user are co-located using various methods. For example, multi-RAT controller 190 may determine that the identified user devices are being served by the same network access device (e.g., same access point or base station) indicating that the devices are in proximity with each other. In another example, the multi-RAT controller 190 may receive location data for the UEs and determine a set of UEs that are in proximity with each other. The UEs determined to be in proximity with each other are considered to be the set of co-located UEs. As illustrated in FIG. 1, UEs 102a, 102b, 102c, and 102d are a set of co-located UEs and thus are considered an ad hoc grouping 170.

In step 320, multi-RAT controller 190 determines that an application executing on one or more of the UEs in ad hoc grouping of UEs requires enhanced servicing. In embodiments, a UE, for example utilizing peer-to-peer connectivity management module 218, transmits a message or other indication to the network when an application that may require data from the network or other forms of network connectivity is launched. Alternatively, the network may identify when a UE is executing a certain class of applications and inform the multi-RAT controller 190. Multi-RAT controller 190 may further include profiles of applications. The application profiles indicate when and if the executing application requires enhanced servicing from a peer UE.

In step 330, multi-RAT controller 190 designates a UE in the ad hoc grouping of UEs 170 as the hub (UE-AP). In embodiments, multi-RAT controller 190 includes profiles related to the capabilities of the UEs in the ad hoc grouping 170. Multi-RAT controller 190 selects a UE from the ad hoc grouping 170 that best meets the needs of the applications executing on the UEs. For example, UE 102b may be designated as the UE-AP.

In step 340, multi-RAT controller 190 initiates AP processing on the designated UE-AP. For example, multi-RAT controller 190 directs the network to send a message to the designated UE (e.g., UE 102b). In response, the UE may launch an application that performs a set of access point functions on behalf of other UEs. This step is optional. In embodiments, a UE may act as a UE-AP without requiring the launching of a specific AP application.

In step 350, multi-RAT controller 190 instructs the other UEs in the ad hoc grouping to establish a communications link with the designated UE-AP. In embodiments, the communications link with the UE-AP is a low power link such as optical, wired or wireless link (e.g., Bluetooth).

In step 360, multi-RAT controller 190 directs the network to handover downlink communications for one or more UEs in the ad hoc group (e.g., group 170) to the UE-AP. The UE-AP may then provide processing or other servicing for the downlink communication before transmitting all or a portion of the downlink communication to the destination UE.

Thin Client UE

As described above, power consumption is an increasing concern in mobile computing, particularly for devices that rely primarily on batteries for power. One technique to conserve power is to temporarily convert one or more UEs in an ad hoc grouping into thin clients. A thin client generally is a device that relies on another device such as a server to operate. In embodiments, a UE in the ad hoc grouping is designated as the "server" for the ad hoc grouping and the other devices are designated as "thin clients." For example, the designated UE server may act as the network stack for the other UEs in the group.

In order to communicate with other network elements, a device utilizes a protocol stack. A protocol stack (also referred to as a network stack) is a hierarchy of layers used by a protocol. For example, TCP/IP network stack includes an application layer supporting one or more protocols such as HTTP, FTP, SMPT, DHCP, etc., a transport layer supporting for example UDP and/or TCP, a network (or Internet) layer supporting IP, and a data link/physical layer supporting Ethernet, 802.11 wireless LAN, Frame Relay, and/or ATM. Thus, the designated "server UE" provides one or more layers of the protocol (network) stack on behalf of the thin client UEs. The thin clients conserve power because they do not have to execute protocols at every layer of the network stack.

As illustrated in FIG. 1, UEs 102e, 102f, and 102g are another ad hoc grouping of UEs (designated 172). In this grouping, UE 102e is designated as the server UE for the ad hoc group 172 and UE 102f and UE 102g are thin client UEs. In this embodiments, all or most of the communications stack is forwarded or directed to UE 102e which then handles communications through a tunnel between UE 102e and the network access device (base station 116).

Figure 4:
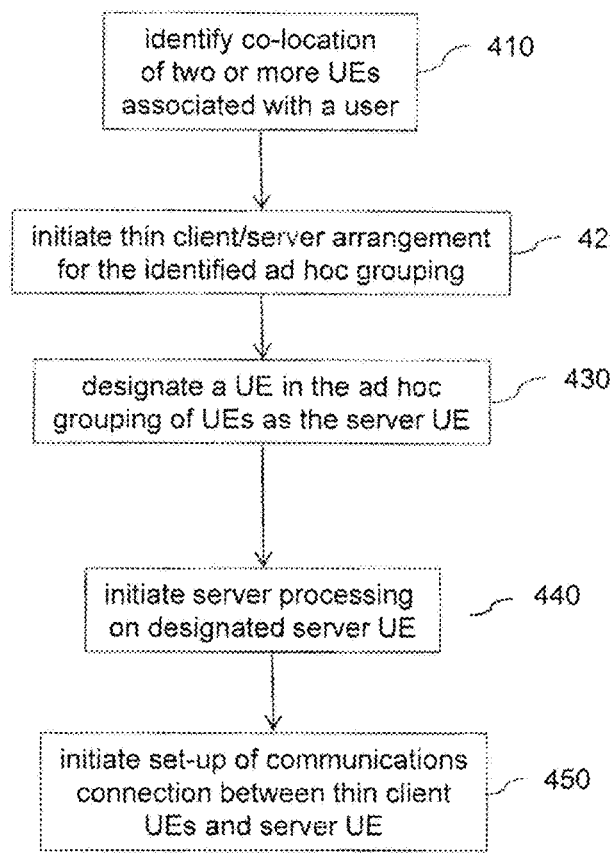
FIG. 4 depicts a flowchart of a method for setting up one or more thin client UEs in an ad hoc grouping of UEs, according to embodiments of the present disclosure.

FIG. 4 depicts a flowchart 400 of a method for setting up one or more thin client UEs in an ad hoc grouping of UEs, according to embodiments of the present disclosure. Flowchart 400 is described with continual reference to the embodiments described in FIGS. 1 and 2. However, flowchart 400 is not limited to those embodiments.

In step 410, multi-RAT controller 190 identifies two or more co-located user devices associated with a user. For example, multi-RAT controller 190 may store a profile for a user. The user profile identifies devices associated with the user. Multi-RAT controller 190 may determine that the devices associated with the user are co-located using various methods. For example, multi-RAT controller 190 may determine that the identified user devices are being served by the same network access device (e.g., same access point or base station) indicating that the devices are in proximity with each other. In another example, the multi-RAT controller 190 may receive location data for the UEs and determine a set of UEs that are in proximity with each other. The UEs determined to be in proximity with each other are considered to be the set of co-located UEs. As illustrated in FIG. 1, UEs 102e, 102f, and 102g are a set of co-located UEs and thus are considered an ad hoc grouping 172.

In step 420, multi-RAT controller 190 initiates a thin client/server arrangement for the identified ad hoc grouping.

In step 430, multi-RAT controller 190 designates a UE in the ad hoc grouping of UEs 172 as the server UE. In embodiments, multi-RAT controller 190 includes profiles related to the capabilities of the UEs in the ad hoc grouping 172. For example, if one of the UEs in the ad hoc grouping is a laptop computer (likely to be using AC power when at the user's location) or another device having superior performance or power profiles, multi-RAT controller 190 designates that UE as the server UE.

In step 440, multi-RAT controller 190 initiates server processing on the designated server UE. For example, multi-RAT controller 190 may direct the network to send a message or another indication to the designated UE informing the UE that it has been designated as the server in an ad hoc client-server arrangement. In response, the peer-to-peer connectivity management module 218 of the UE may initiate an application for providing server UE functionality.

In step 450, multi-RAT controller 190 initiates thin client processing, on one or more UEs in the ad hoc grouping 172. For example, multi-RAT controller 190 may direct the network to send a message or other indication to the non-designated UEs informing those UE that they have been designated as thin clients in the ad hoc client-server arrangement. In response, the non-designated UEs set-up a communications connection with the server UE. In embodiments, the communications link with the UE-AP is a low power link such as optical, wired or wireless link (e.g., Bluetooth). In addition, in this step the non-designated UEs may temporarily disable or suspend portions of their network stack.

Following step 450, an ad hoc thin client-server network has been established for grouping 172. The thin clients then utilize the protocol stack on the server UE (e.g., UE 102e) for communications. Server UE 102e tunnels traffic from the thin client UEs to the network.

Sleep Mode and Staged Connectivity

In further embodiments of the disclosure, power conservation is achieved through selective sleep mode and staged connectivity. For example, embodiments allow a set of UEs in an ad hoc grouping of UEs, particularly those that have power constraints, to enter a sleep state, powering down unneeded circuitry. Incoming traffic destined these devices in a sleep state is diverted and processed by a single hub UE in the ad hoc group.

Figure 5:
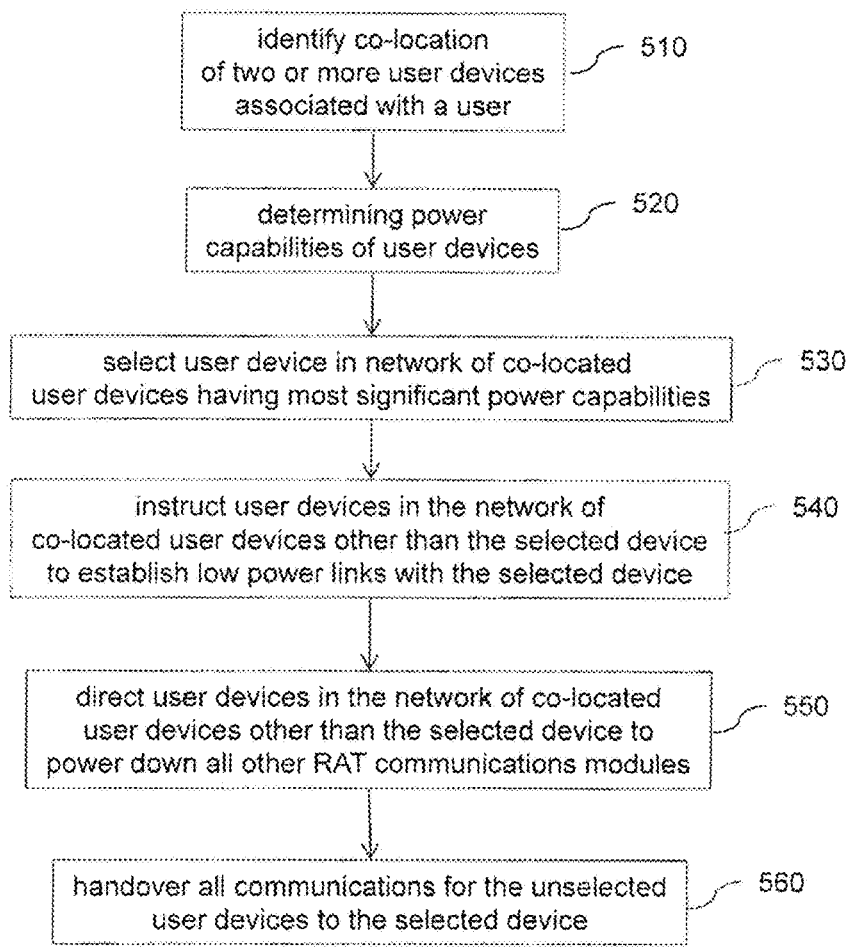
FIG. 5 depicts an exemplary flowchart of a method for controlling sleep mode and staged connectivity at a multi-RAT controller, according to embodiments of the present disclosure.

FIG. 5 depicts an exemplary flowchart 500 of a method for controlling sleep mode and staged connectivity at a multi-RAT controller, according to embodiments of the present disclosure. Flowchart 500 is described with continued reference to the exemplary embodiments of FIGS. 1 and 2. However, flowchart 500 is not limited to those embodiments.

In step 510, multi-RAT controller 190 identifies two or more co-located UEs associated with a user. For example, multi-RAT controller 190 may store a profile for a user. The user profile identifies devices associated with the user. Multi-RAT controller 190 may determine that the devices associated with the user are co-located using various methods. For example, multi-RAT controller 190 may determine that the identified UEs are being served by the same network access device (e.g., same access point or base station) indicating that the devices are in proximity with each other. In another example, the multi-RAT controller 190 may receive location data for the user devices and determine a set of UEs that are in proximity with each other. The UEs determined to be in proximity with each other are considered to be the set of co-located UEs.

In step 520, multi-RAT controller 190 determines the power capabilities of the UEs in the set of co-located UEs. In an embodiment, the user profile indicates the power capabilities of UEs associated with the user. For example, if the user device is a laptop, the power capabilities may reflect that the laptop has AC power capabilities. If the user device is a cell phone, the power capabilities may reflect that the primary power for the device is a battery. In further example, the profile may indicate the battery life associated with a device. In another example, profiles for various device types may be stored at the multi-RAT controller 190.

In step 530, multi-RAT controller 190 selects the user device in the set of co-located devices that has the most significant power capabilities as the hub UE. For example, if the set of co-located devices includes a laptop computer and a wireless phone, the multi-RAT controller 190 may select the laptop computer as the hub UE.

In step 540, multi-RAT controller 190 instructs the unselected UEs in the set of co-located user devices to establish a communications link with the hub device. In embodiments, the communications link with the hub device is a low power link such as optical, wired or wireless link (e.g., Bluetooth).

In step 550, multi-RAT controller 190 directs unselected UEs to enter sleep mode and power down all RAT communications modules other than the RAT communications module required to communicate with the hub user device. In embodiments, a UE determines when to power down its RAT communications modules after sleep mode is initiated.

In step 560, multi-RAT controller 190 instructs the networks serving the unselected UEs to handover communications for the unselected devices to the hub device.

Figure 6:
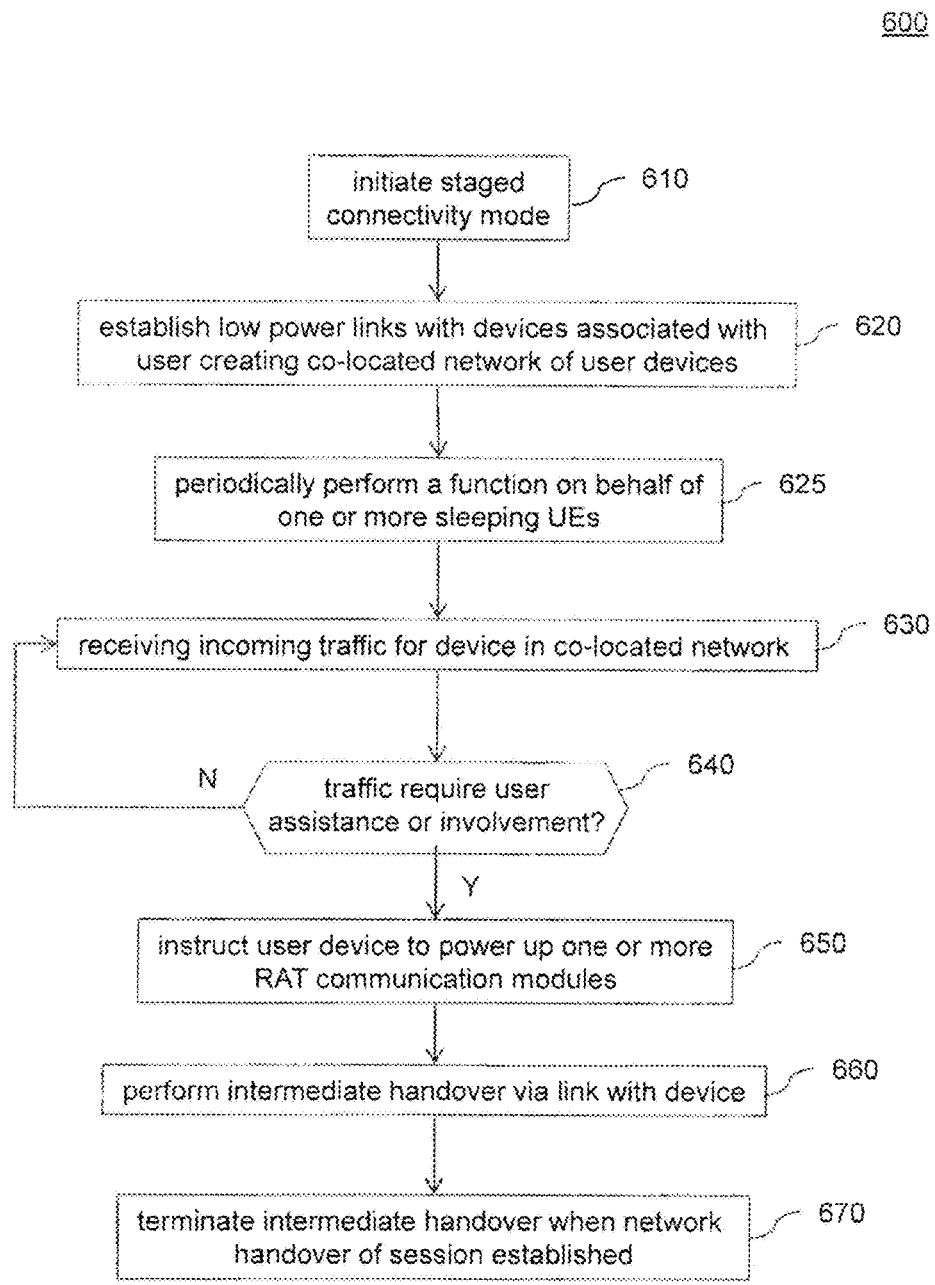
FIG. 6 depicts an exemplary flowchart of a method for sleep mode and staged connectivity from the perspective of the hub UE in the set of co-located UEs, according to embodiments of the present disclosure.

FIG. 6 depicts an exemplary flowchart 600 of a method for sleep mode and staged connectivity from the perspective of the hub UE in the set of co-located UEs, according to embodiments of the present disclosure. Flowchart 600 is described with continued reference to the exemplary embodiments of FIGS. 1 and 2. However, flowchart 600 is not limited to those embodiments.

In step 610, the hub UE initiates staged connectivity mode. In an embodiment, staged connectivity mode is initiated by a signal received from the multi-RAT controller 190. As part of initiating staged connectivity mode, the hub UE identifies one or more co-located UEs. In an embodiment, the identification of co-located UEs is provided by the network.

In step 620, the hub UE establishes communications links with one or more UEs in the set of co-located UEs. As described above, the communications links may be low powered communications links such as optical or Bluetooth.

In step 625, the hub UE periodically performs a function on behalf of a sleeping UE. For example, a UE executing an email application may normally wakeup to check for incoming email. If the UE executing this application is sleeping, the hub UE may perform this process.

In step 630, the hub UE receives incoming traffic for a UE in the set of co-located UEs.

In step 640, the hub UE determines whether the received incoming traffic requires user assistance or involvement. That is, the hub UE preprocesses the received data to determine whether to wake up a sleeping UE. If the traffic does not require user assistance or involvement, operation returns to step 630. If the traffic requires user assistance or involvement, operation proceeds to step 650.

In step 650, the hub UE instructs the sleeping UE to power up one or more of its RAT communications modules.

In step 660, the hub UE continues to receive traffic for the UE and transfers the received traffic to the UE during the period with the UE is waking up.

In step 670, when network handover of session with user device is established, the hub UE no longer receives traffic for the UE. For example, the UE may power up its RAT communications module and synchronize with a network access point. At that point, the hub device may receive an indication that the communications session has been successfully handed over to the UE.

Steps 630 through 670 may be repeated for the devices in sleep mode in the set of co-located UE. In embodiments, a UE that is instructed to wake up to receive communications may subsequently re-enter sleep mode. A multi-RAT controller 190 may instruct the hub UE to terminate the method of FIG. 6. Termination may be initiated when one or more devices in the set of co-located UEs is moved to be out of proximity of the other devices.

Figure 7:
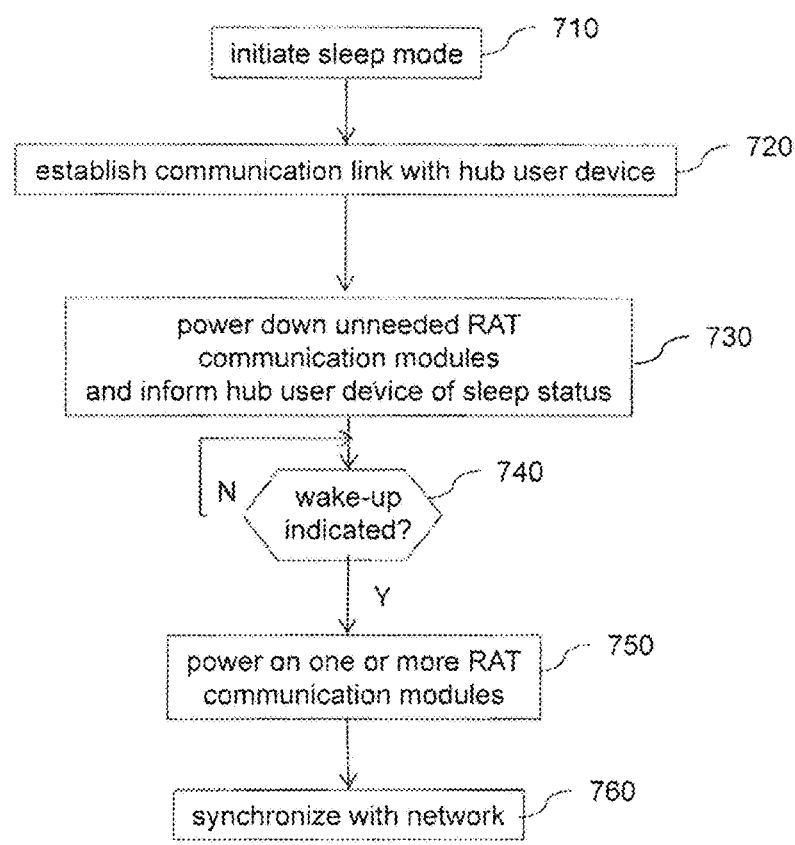
FIG. 7 depicts an exemplary flowchart of a method for sleep mode and staged connectivity from the perspective of an unselected device in the set of co-located UEs, according to embodiments of the present disclosure.

FIG. 7 depicts an exemplary flowchart 700 of a method for sleep mode and staged connectivity from the perspective of an unselected device in the set of co-located UEs, according to embodiments of the present disclosure. Flowchart 700 is described with continued reference to the exemplary embodiments of FIGS. 1 and 2. However, flowchart 700 is not limited to those embodiments.

In step 710, sleep mode is initiated. In an embodiment, sleep mode may be initiated upon receipt of a message from multi-RAT controller 190. In a further embodiment, the activity characteristics of the UE may be used to determine whether RAT communications modules should be powered down. For example, triggers for initiating sleep mode may include a user configuration setting or user selection such as power down or selection of an idle button. Other triggers may be inactivity for a predetermined period of time or a change in power levels such as indication that device is in need of charging.

In step 720, a communications link with the hub UE is established. As discussed above, the communications link may be a low power communications link.

In step 730, UE powers down unnecessary RAT communications modules. For example, the UE may power down all RAT communications modules except for the communications module used to communicate with the hub device.

In step 740, a determination is made whether wake up is indicated. Wake-up may be indicated by a signal received from the hub UE. In addition, wake-up may be indicated if the UE leaves the communication range of the user device. If wake up is not indicated, operation remains at step 740. If wake-up is indicated, operation proceeds to step 750.

In step 750, the UE powers up one or more RAT communications modules.

In step 760, the UE searches for network access points and synchronizes with a network access point.

While the UE is synchronizing with a network access point such as a base station. An intermediate handover occurs between the hub UE and the waking UE. During the intermediate handover, traffic is received from the hub UE over the communications link between the hub UE and the waking UE. This intermediate handover provides sufficient time for the sleeping UEs to power up the RAT radio (e.g., LTE RAT) and gain access and ultimately handover of the session.

For example, in FIG. 1, UEs 102a, 102b, 102c, and 102d are a co-located grouping of UEs. Assume that UE 102b is a laptop and the remaining UEs are cell phones. In this example, multi-RAT controller 190 designates UE 102b as the hub UE. The remaining UEs (UE 102a, UE 102c and UE 102d) are directed to enter sleep mode. Laptop UE 102b and wireless phone UE 102a have overlapping application functionality (e.g., email). All incoming traffic destined for the overlapping applications of UE 102a are transmitted to laptop UE 102b. Laptop UE 102b processes the data and determines whether a need exists to wake up wireless phone 102a. This mode is particularly beneficial when the incoming traffic does not rise to a level needing user assistance or involvement.

Sleep Mode with Cross-RAT Support

The wake up process for certain RATs such as the WiFi wakeup process is not power efficient. For example, a WiFi UE wastes significant power in order to enable detection of any packet or information which may be sent while the UE is in sleep mode. Embodiments of the present disclosure provide a sleep mode having cross-RAT support. This sleep mode will allow a multi-RAT UE to monitor traffic for one RAT (e.g., WiFi) via the control channel of another RAT (e.g., LTE, 3G, etc.).

Figure 8:
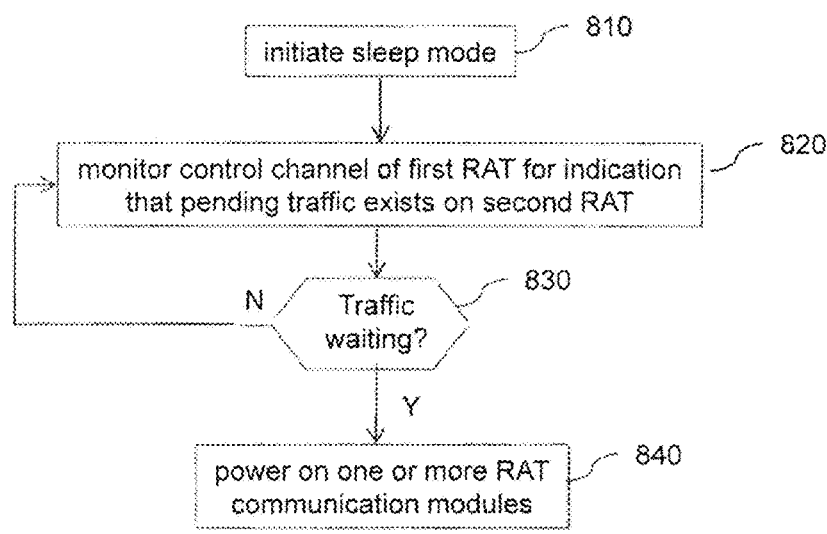
FIG. 8 depicts a flowchart of a method for sleep mode with cross-RAT support, according to embodiments of the present disclosure.

FIG. 8 depicts a flowchart 800 of a method for sleep mode with cross-RAT support, according to embodiments of the present disclosure. Flowchart 800 is described with continued reference to the embodiments of FIGS. 1 and 2. However, flowchart 800 is not limited to those embodiments.

In step 810, sleep mode is initiated at a UE. In an embodiment, sleep mode may be initiated upon receipt of a message from multi-RAT controller 190. In a further embodiment, the activity characteristics of the UE may be used to determine whether RAT communications modules should be powered down. For example, triggers for initiating sleep mode may include a user configuration setting or user selection (such as power down or selection of an idle button. Other triggers may be inactivity for a predetermined period of time or a change in power levels such as indication that device is in need of charging.

In step 820, the sleeping UE monitors the control channel of a first RAT (e.g., LTE RAT) for indication that pending traffic exists on a second RAT. The UE may monitor the cellular paging channel for an indication of pending WiFi traffic. For example, when the UE has a packet on the WiFi network, this information is signaled on the cellular PCH channel with the indication "WiFi." The monitoring rate in this case is 1-2 frames every 2.56 seconds.

In step 830, a determination is made whether pending traffic is waiting on the second RAT. If pending traffic is waiting, operation proceeds to step 840. If no pending traffic is waiting, operation returns to step 820.

In step 840, UE wakes up the circuitry for the second RAT and receives the pending traffic.

Further embodiments of the present disclosure provide access and handover service that span multiple RATs that allocate a single control or messaging channel to support independent payload RAT links. In these embodiments, multi-RAT controller 190 configures control signaling over one RAT pathway. Payload exchanges are handed over simultaneously via other RAT pathways. Through these techniques, particular RATs dedicated to servicing payload may sleep while control messaging/paging is received via another RAT pathway.

Peer-to-Peer Handovers

Figure 9:
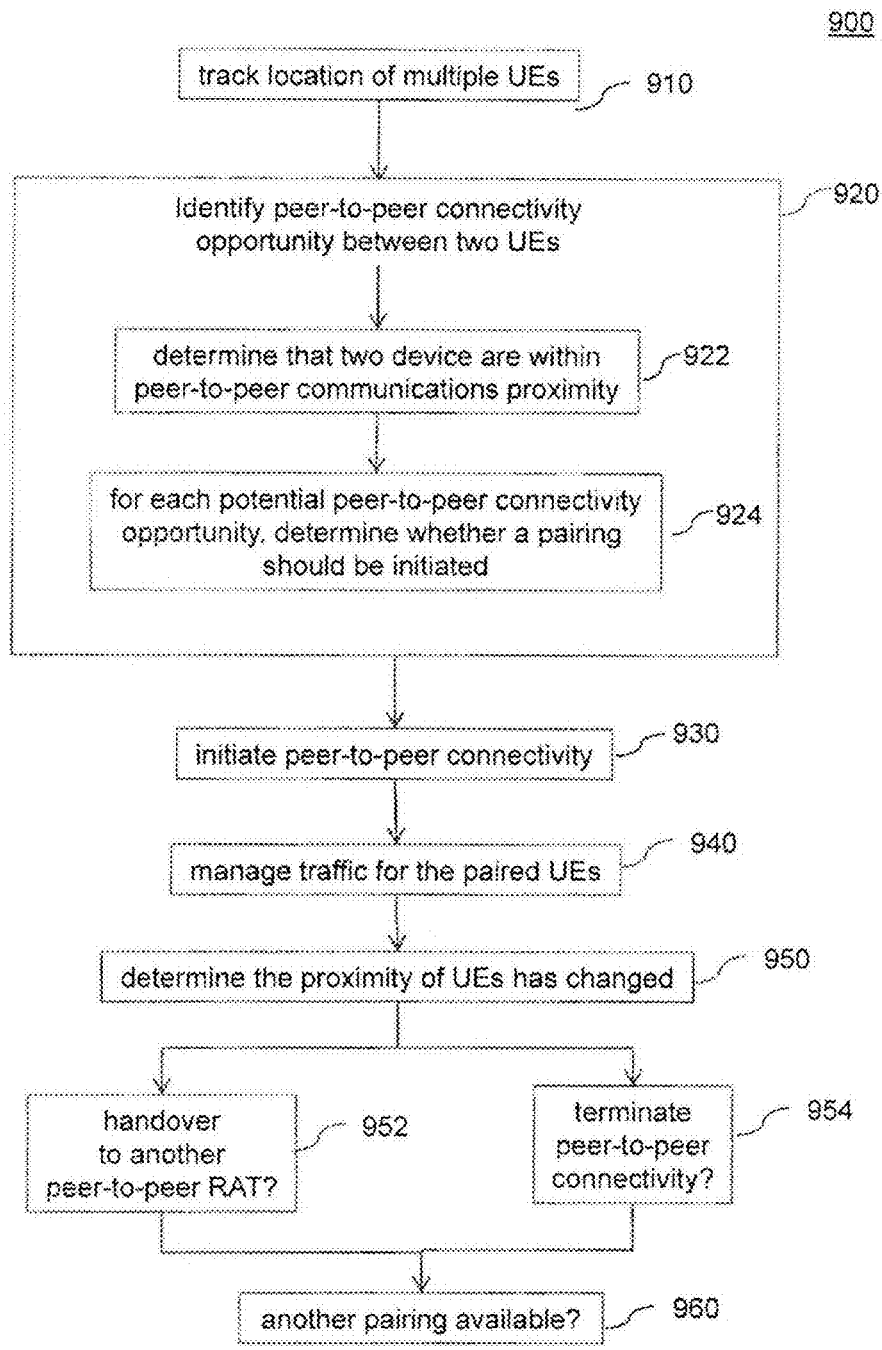
FIG. 9 depicts a flowchart of a method for centralized support for peer-to-peer handovers, according to embodiments of the present disclosure.

Embodiments of the present disclosure further support centralized management of peer to peer handovers. In these embodiments, the network keeps the location of UEs and automatically pairs them when they are close to one another. FIG. 9 depicts a flowchart 900 of a method for centralized support for peer-to-peer handovers, according to embodiments of the present disclosure. Flowchart 900 is described with continued reference to the embodiments of FIGS. 1 and 2. However, flowchart 900 is not limited to those embodiments.

In step 910, the network, such as network B of FIG. 1, tracks location information for multiple UEs. Location data can be tracked using GPS data obtained from UEs. In addition, or alternatively, location data may be derived from other available network data. An element in the network such as multi-RAT controller 190 stores and/or otherwise tracks the location data for the multiple UEs. Although illustrated as a separate step, a person of ordinary skill in the art will recognize that the tracking and storing of location data may occur continuously including during the operation of other steps of flowchart 800.

In step 920, identifies a peer-to-peer connectivity opportunity between two UEs. Step 920 includes two steps—step 922 and 924.

In step 922, the network (e.g., multi-RAT controller 190) determines that two devices are within peer-to-peer communications proximity. For example, as illustrated in FIG. 1, multi-RAT controller 190 may determine that UE 102x and UE 102y are within communications proximity.

In step 924, for each potential peer-to-peer connectivity opportunity identified, a determination is made whether the pairing should be initiated. The decision to initiate a pairing may be based on a number of factors. For example, multi-RAT controller 190 may access profiles associated with one or both UEs. The profiles may indicate battery considerations for a UE and prediction of availability of a UEs RAT coupling capability. Additional factors may include information about the UE relationship (e.g., are both customers of the same operator, are the UEs in the same group or family) or preferences by the UE (e.g., UE does not permit pairing or only permits pairing under a set of predefined conditions).

If a pairing opportunity is identified in step 920, operation proceeds to step 930. If no pairing opportunity is identified, operation remains at step 920.

In step 930, the network (e.g., multi-RAT controller 190) initiates the establishment of peer-to-peer connectivity. In addition, the network may designate a RAT to use for the connection (e.g., Bluetooth, optical, etc.). In this step, the network may send a message to one or both UEs instructing them to establish the peer-to-peer connection. The message includes information such as the target UE for the connection.

In embodiments, each of the UEs may support Wi-Fi. In these embodiments, the UEs may utilize tunneled direct link setup (TDLS) to directly connect to one another. Once paired, the two UEs can transfer content and share applications. Such pairings allow a network to more efficiently utilize bandwidth.

In step 940, multi-RAT controller 190 manages traffic for the paired UEs. For example, multi-RAT controller 190 may direct a first RAT pathway (e.g., pathway through AP 116)

to UE 102*x* and a second RAT pathway (e.g., pathway through AP 118) to provide for communications exchange between the two UEs.

In step 950, a determination is made whether the proximity of UEs has changed. For example, if the UEs have moved closer to one another, operation proceeds to step 952. If the UEs have move farther away from one another, operation proceeds to step 954.

In step 952, if the UEs have moved closer to one another, a decision is made whether to initiate a handover to another peer-to-peer RAT. For example, if the UEs have moved to a line of sight distance and an optical link has become available, multi-RAT controller 190 may direct a complete or a split handover of a portion of the communication exchange to the optical link.

In step 954, if the UEs have moved farther from one another, a determination is made whether to terminate the peer-to-peer connectivity. For example, if the UEs have moved out of range of one another or moved a sufficient distance to degrade quality of service, multi-RAT controller may initiate a termination of peer-to-peer connectivity between the devices.

In step 960, a determination is made whether a UE in the pairing has moved to a position where another pairing opportunity is available. For example, in FIG. 1, UE 102*y* may move to be in the proximity of UE 102*z*. In this circumstance, multi-RAT controller 190 determines whether the new pairing should be initiated. As part of this determination, multi-RAT controller 190 determines a ranking of the available pairings. If the new pairing ranks higher than the existing pairing, operation proceeds to step 970. If the new pairing ranks lower than the existing pairing, steps 940-960 are repeated.

Processing Resource Handover

Figure 10:
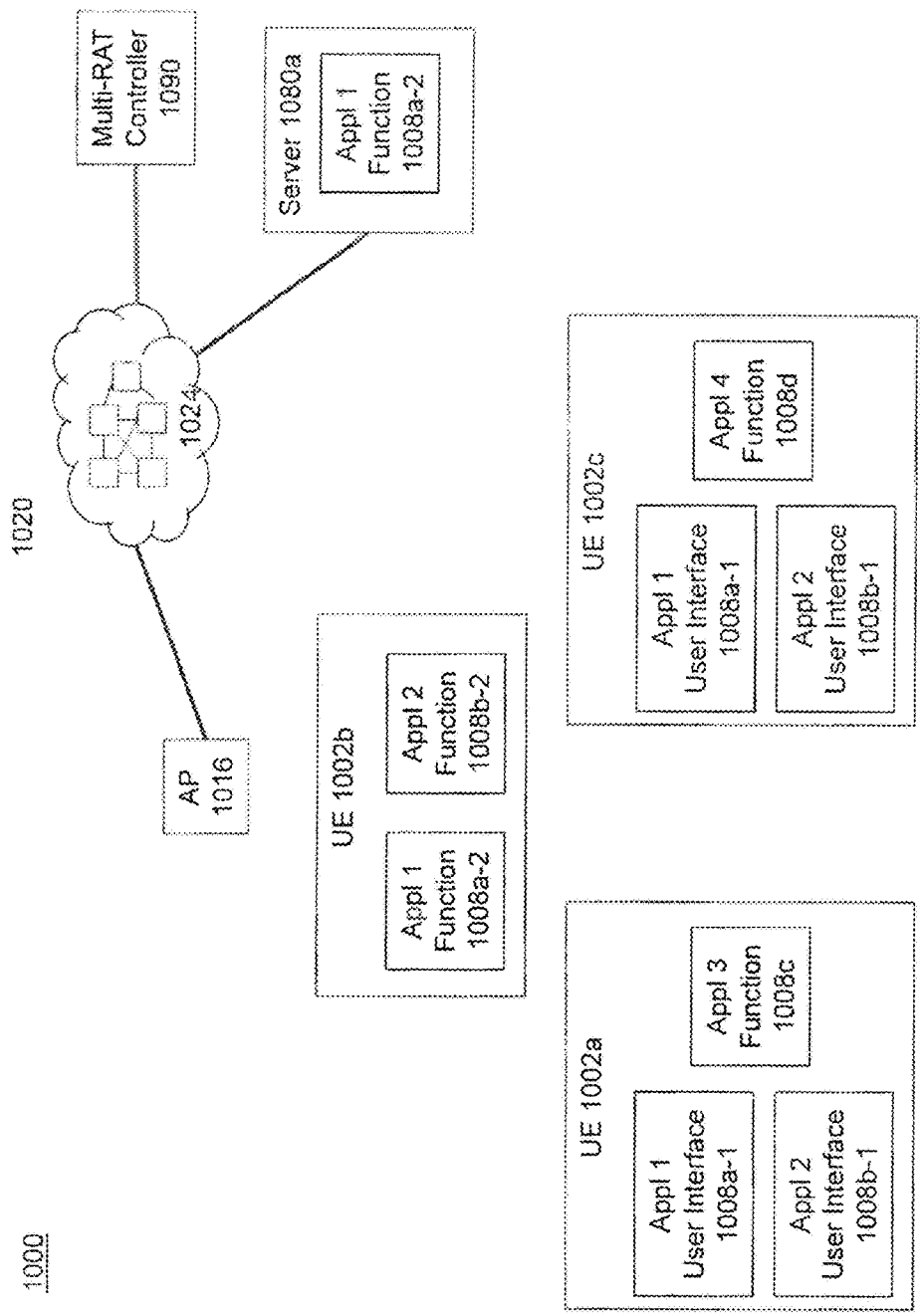
FIG. 10 illustrates an exemplary operating environment for processing resource handover, according to embodiments of the present disclosure.

Embodiments of the present disclosure further support handover of processing resources. FIG. 10 illustrates an exemplary operating environment 1000 for processing resource handover, according to embodiments of the present disclosure. Operating environment 1000 depicts a single network. However, as would be recognized by a person of ordinary skill in the art, multiple networks could be included in the operating environment.

The network includes core network 1020 having multiple switching and/or routing elements and one or more network access devices such as access point 1016.

As illustrated in FIG. 10, multiple UEs associated with a user (e.g., UE 1002*a*, UE 1002*b*, and UE 1002*c*) may be in proximity to one another. In addition, these UEs may perform many similar functions (e.g., email, calendars, media players, etc.). In embodiments, one or more of these functions (applications) are designed such that the user interface (UE) elements can exist on any UE with the underlying processing being performed on another device of the user. As shown in FIG. 10, application 1 and application 2 are designed to have a split UI and function. In this example, UE 1002*a* and UE 1002*c* have application 1 user interface components 1008*a*-1 and application 2 user interface components 1008*b*-1. UE 1002*b* has application 1 and application 2 functional components 1008*a*-2 and 1008*b*-2.

Operating environment 1000 further includes a multi-RAT controller 1090. In embodiments, a user and/or UEs register split processing capabilities with the multi-RAT controller 1090. Multi-RAT controller 1090 therefore may include profiles for a user including a listing of UEs associated with the user and processing and split processing capabilities of the UEs associated with the user.

In addition, operating environment 1000 may include one or more servers hosting application functions. For example, as illustrated in FIG. 10, server 1080*a* includes a function component for application 1 1008*a*-2. In the event that the UE 1002*b* is unavailable, multi-RAT controller 1090 may handover function processing to sever 1080.

Figure 11:
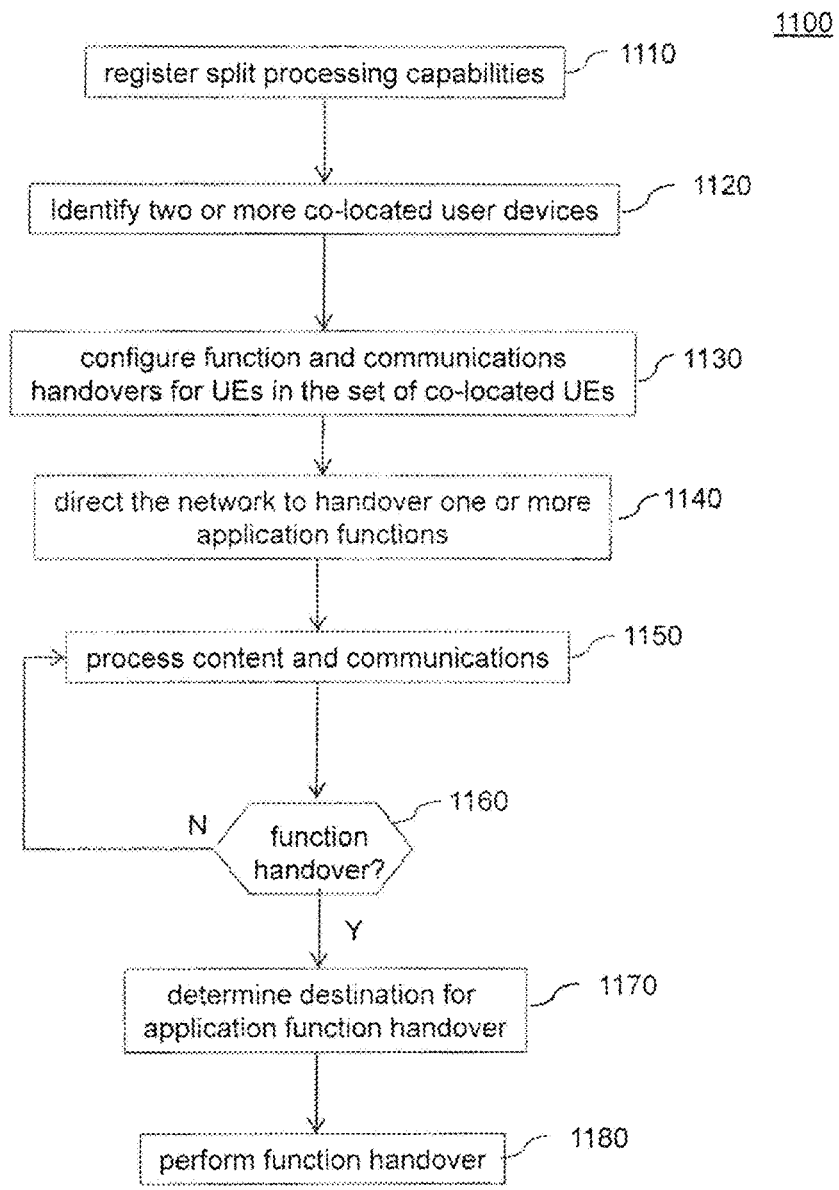
FIG. 11 depicts a flowchart of a method for processing resource handover, according to embodiments of the present disclosure.

FIG. 11 depicts a flowchart 1100 of a method for processing resource handover, according to embodiments of the present disclosure. Flowchart 1100 is described with continued reference to the embodiment of FIG. 10. However, flowchart 1100 is not limited to that embodiment.

In step 1110, split processing capabilities for a set of UEs associated with a UE is registered with a multi-RAT controller. For example, in FIG. 10, application 1 and 2 are registered as split processing application for a user. In embodiments, a profile for the user identifies application 1 user interface as residing on UE 1002*a* and UE 1002*c*, application 1 function as residing on UE 1002*b*, application 2 user interface as residing on UE 1002*a* and UE 1002*c*, and application 2 function as residing on UE 1002*b*.

In step 1120, multi-RAT controller 1090 identifies two or more co-located user devices associated with a user. As described above, multi-RAT controller 1090 may store a profile for a user identifying devices associated with the user. Multi-RAT controller 1090 may determine that the devices associated with the user are co-located using various methods. For example, multi-RAT controller 1090 may determine that the identified user devices are being served by the same network access device (e.g., same access point or base station) indicating that the devices are in proximity with each other. In another example, the multi-RAT controller 1090 may receive location data for the UEs and determine a set of UEs that are in proximity with each other. The UEs determined to be in proximity with each other are considered to be the set of co-located UEs. As illustrated in FIG. 10, UEs 1002*a*, 1002*b*, and 1002*c* are a set of co-located UEs of a user.

In step 1130, multi-RAT controller 1090 configures function and communications handovers for the UEs in the set of co-located UEs associated with the user. The function and handover configuration is designed to achieve optimal performance. The configuration may be based on a number of factors such as resource capabilities including GPS, processing, memory, SLA, power reserves, application requirements (latency, bandwidth), redundancy, fallback, etc. and real-time factors (e.g., cost factors).

In step 1140, multi-RAT controller 1090 directs the network to handover one or more application functions when an application having split processing is initiated by a UE in the set of UEs. For example, when UE 1002*a* executes application 1, multi-RAT controller 1090 establishes a pathway from access point 1016 through UE 1002*b* to UE 1002*a* instead of between access point 1016 to UE 1002*a*. In this example, UE 1002*b* is commissioned to perform the function of application 1. UE 1002*a* only needs to perform the user interface portion of the overall application functionality.

In step 1150, the network continues to process content and communications in accordance with the function and communication handover configuration for the set of co-located user UEs.

In step 1160, a determination is made whether a function handover for an application is required. If a function handover is required, operation proceeds to step 1170. If a function handover is not required, operation returns to step 1150. A function handover may be required in a number of circumstances. For example, if the UE (e.g., UE 1002*b*)

performing the application function on behalf of another UE (UE 1002*a*) is powered down or leaves the communication range of the UE (UE 1002*a*), the application function must be handed over so as to not disrupt the operation of the executing application.

In step 1170, multi-RAT controller 1090 determines a destination for the application function handover. For example, the destination for the function handover may be to a remote server hosting the application function. In FIG. 10, the network may handover application 1 function processing from UE 1002*b* to server 1080. The communications handover may in turn flow in whole or in part through the remote server 1080.

In step 1180, the function handover for the application is performed.

Although FIGS. 10 and 11 describe that a centralized multi-RAT controller 1090 directs split processing resource handovers, as would be appreciated by persons of ordinary skill in the art, other network elements could perform this function.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method for performing staged connectivity in a network controller comprising:
    identifying a plurality of proximate wireless devices, wherein each proximate wireless device includes a first radio access technology (RAT) module and a second RAT module, wherein the first RAT module is used to communicate with a provider that serves the corresponding proximate wireless device, and wherein the second RAT module is used to communicate with a hub wireless device;
    determining a power capability for each proximate wireless device in the plurality of proximate wireless devices;
    selecting a wireless device in the plurality of proximate wireless devices as the hub wireless device based on the power capabilities of the plurality of proximate wireless devices;
    instructing wireless devices in the plurality of proximate wireless devices, other than the hub wireless device, to enter sleep mode, wherein the sleep mode powers down the first RAT module in each proximate wireless device that enters sleep mode, while maintaining power to the second RAT module in each proximate wireless device that enters sleep mode; and
    instructing the providers serving the wireless devices in the plurality of proximate wireless devices, other than the provider serving the hub wireless device, to handover communications for the respective wireless devices to the hub wireless device,
    wherein the first RAT module in each proximate wireless device operates according to a first RAT type that is different from a second RAT type operated by the second RAT module in each proximate wireless device.

2. The method of claim 1, wherein each of the plurality of proximate wireless devices is associated with a user.

3. The method of claim 2, further comprising:
    receiving a registration request for a wireless device in the plurality of wireless device including an identification of the user and information regarding the wireless device including an identification of a type for the wireless device.

4. The method of claim 3, further comprising:
    storing a set of wireless device profiles including an identification of the wireless device type and a power profile for the wireless device type.

5. The method of claim 1, wherein identifying the plurality of proximate wireless devices comprises:
    receiving location data for a set of wireless devices in a geographic area; and
    determining, based on the received location data, wireless devices that are in communication range of each other; and
    determining a set of wireless devices to include in the plurality of proximate wireless devices.

6. The method of claim 1, wherein selecting the wireless device in the plurality of proximate wireless devices as the hub wireless device comprises:
    selecting a wireless device in the plurality of proximate wireless devices having the greatest power capabilities as the hub wireless device.

7. The method of claim 1, wherein selecting the wireless device in the plurality of proximate wireless devices as the hub wireless device comprises:
    selecting a wireless device in the plurality of proximate wireless devices operating with an AC power supply.

8. The method of claim 1, further comprising receiving incoming traffic destined for a first wireless device of the plurality of proximate wireless devices at the hub wireless device, and performing by the hub wireless device a function on behalf of the first wireless device based on the incoming traffic.

9. The method of claim 1, wherein the second RAT type is low-power compared to the first RAT type.

10. The method of claim 1, wherein the power to the second RAT module is continuously maintained while the hub wireless device maintains its hub status.

11. A method for staged connectivity in a set of wireless devices including a hub wireless device and a proximate wireless device, comprising:

initiating, in the hub wireless device, staged connectivity with the proximate wireless device;

establishing a communication link between the hub wireless device and the proximate wireless device using a first radio access technology (RAT);

receiving incoming traffic at the hub wireless device, the incoming traffic destined for the proximate wireless device and sent from a provider that services the proximate wireless device, and performing by the hub wireless device a function on behalf of the proximate wireless device based on the incoming traffic;

when the incoming traffic requires involvement from the proximate wireless device, instructing the proximate wireless device to power a second RAT module that operates according to a second RAT to handle the incoming traffic; and disabling the communication link between the hub wireless device and the proximate wireless device when a handover of the incoming traffic for the proximate wireless device occurs.

12. The method of claim 11, wherein initiating includes receiving a signal from a network controller.

13. The method of claim 12, wherein the signal includes an identification of the proximate wireless device.

14. The method of claim 11, wherein the communication link is a low-powered communication link compared to a second communication link used to communicate with the provider.

15. The method of claim 11, wherein the function is checking email on behalf of the proximate wireless device.

16. The method of claim 11, further comprising:
after instructing the proximate wireless device to power the second RAT module, receiving at the hub wireless device incoming traffic destined for the proximate device for an intermediate period.

17. The method of claim 16, further comprising:
receiving an indication that handover to for proximate wireless device is complete.

18. The method of claim 11, wherein the set of wireless devices includes a second proximate wireless device.

19. The method of claim 18, further comprising:
initiating, in the hub wireless device, staged connectivity with the second proximate wireless device.

20. A hub wireless device for staged connectivity, comprising:
a first radio access technology (RAT) module configured to support a first RAT technology;
a communication module configured to support low-powered communications;
a processor; and
a peer-to-peer connectivity module configured to:
initiate, in the hub wireless device, staged connectivity with a proximate wireless device,
establish a communication link between the hub wireless device and the proximate wireless device using the communication module,
receive incoming traffic at the hub wireless device, the incoming traffic destined for the proximate wireless device and sent from a provider that services the proximate wireless device, and perform a function on behalf of the proximate wireless device based on the incoming traffic,
when the incoming traffic requires involvement from the proximate wireless device, instruct the proximate wireless device to power an appropriate RAT module to handle the incoming traffic, and
disable the communication link between the hub wireless device and the proximate wireless device when a handover of the incoming traffic for the proximate wireless device occurs.

21. The hub wireless device of claim 20, further comprising a second RAT module.

22. The hub wireless device of claim 20, wherein the first RAT module is configured to support a cellular protocol.

\* \* \* \* \*

UNITED STATES PATENT AND TRADEMARK OFFICE
CERTIFICATE OF CORRECTION

PATENT NO. : 9,763,155 B2
APPLICATION NO. : 14/270983
DATED : September 12, 2017
INVENTOR(S) : Carmon et al.

Page 1 of 1

It is certified that error appears in the above-identified patent and that said Letters Patent is hereby corrected as shown below:

In Column 14, Line 26, replace "plurality of wireless device" with --plurality of proximate wireless devices--.

In Column 15, Line 37, replace "that handover to for proximate" with --that the handover for the proximate--.

Signed and Sealed this
First Day of May, 2018

Andrei Iancu
*Director of the United States Patent and Trademark Office*